May 3, 1966   H. F. PHIPARD, JR   3,249,142
LOCK SCREW
Filed July 18, 1963   3 Sheets-Sheet 3

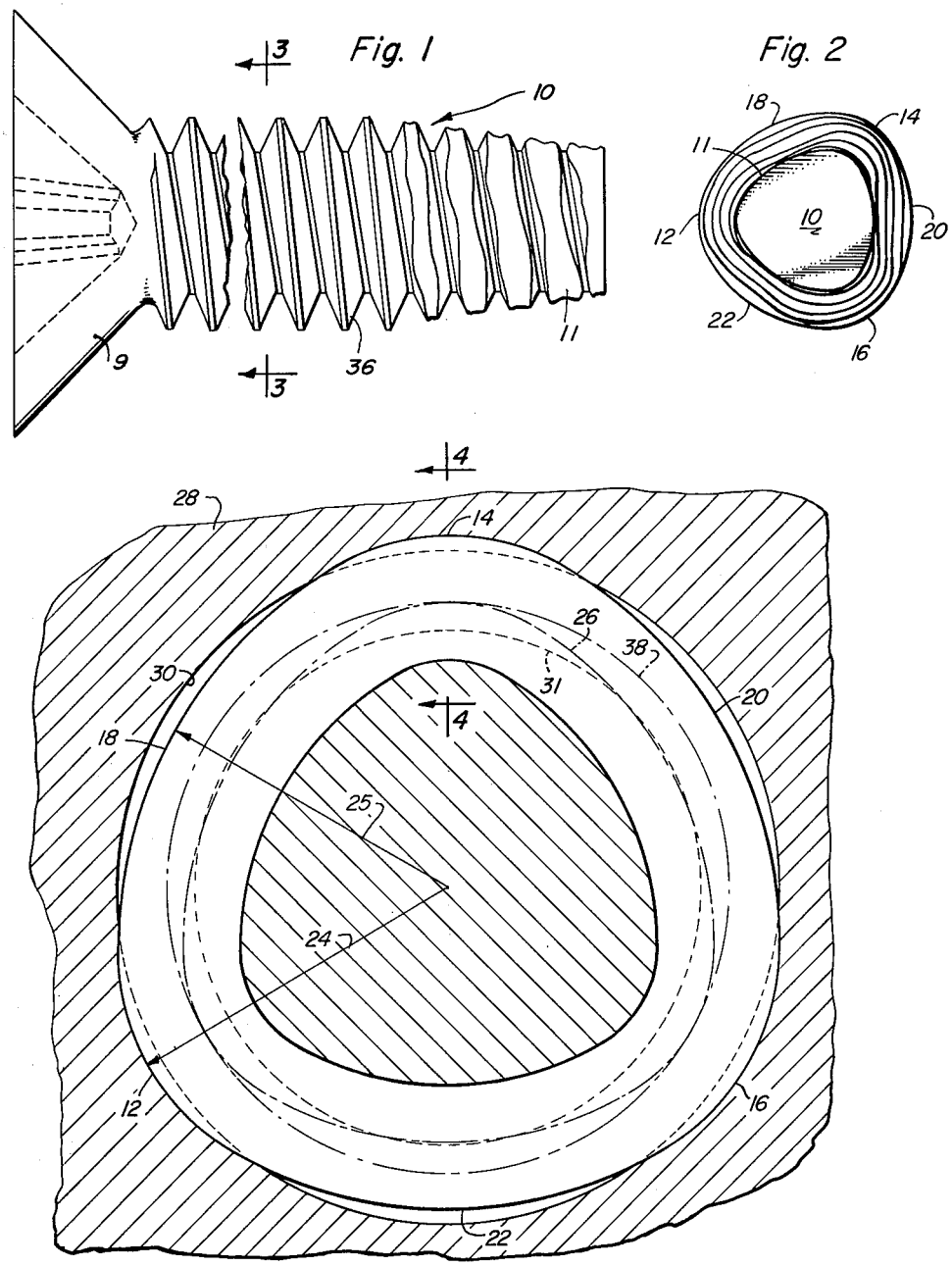

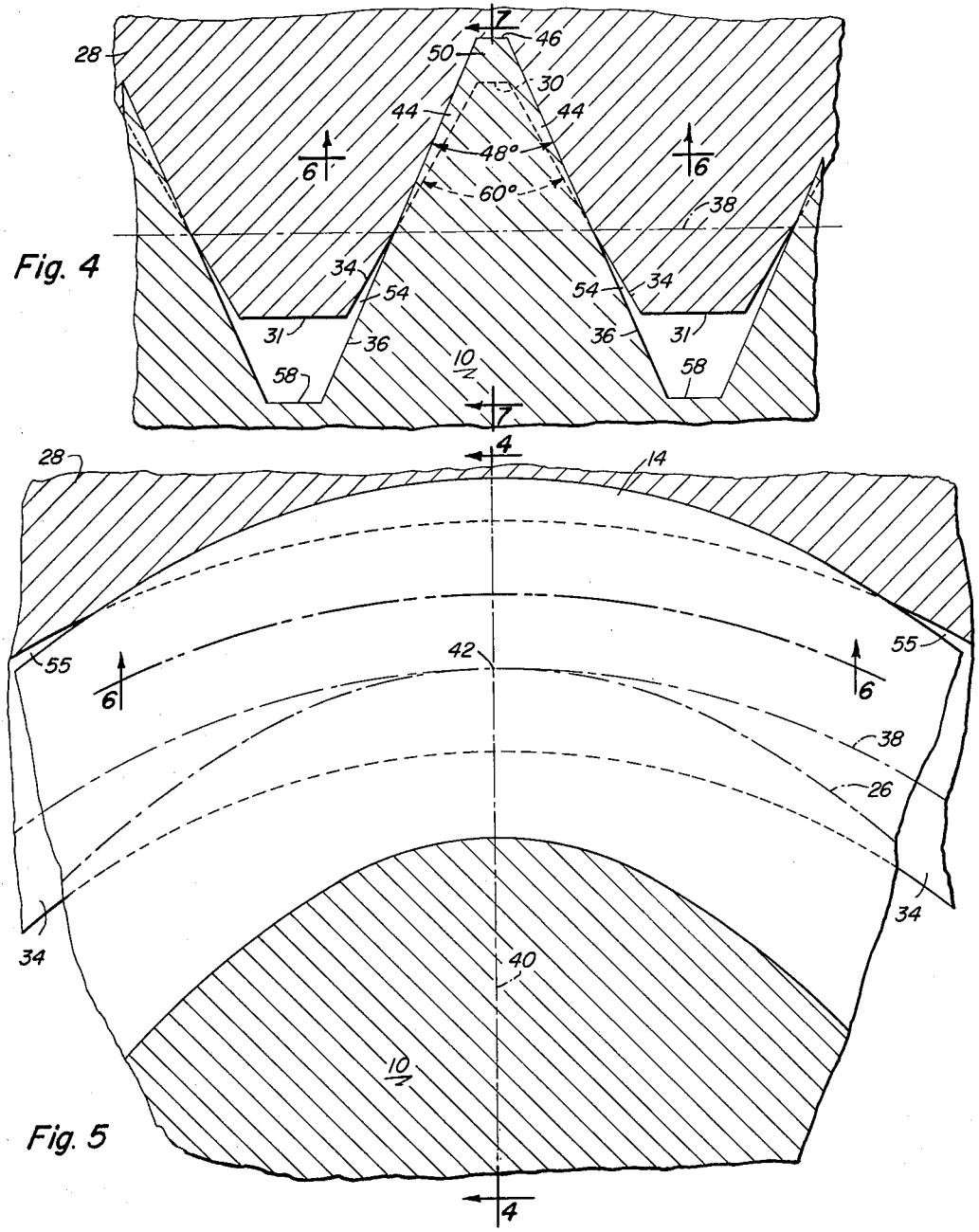

INVENTOR.
HARVEY F. PHIPARD, JR.
BY
BUCKHORN, BLORE, KLARQUIST & SPARKMAN

United States Patent Office

3,249,142
Patented May 3, 1966

3,249,142
LOCK SCREW
Harvey F. Phipard, Jr., South Dartmouth, Mass., assignor to Research Engineering & Manufacturing, Inc., New Bedford, Mass., a corporation of Massachusetts
Filed July 18, 1963, Ser. No. 296,010
3 Claims. (Cl. 151—22)

This invention relates to screw threads and more particularly, to mating threads of male and female threaded members designed so as to provide a predetermined interference between the threads and to resist separation after repeated usage.

Interference between mating threads of male and female members has been suggested frequently as an effective means for tightly securing the two parts together, but such arrangements as have been devised heretofore have been subject to numerous disadvantages. In most instances of prior art arrangements, after two or three separations the interference is substantially eliminated with the result that after slight usage the two threads glide smoothly across each other with little or no residual back-off torque. It has been attempted to overcome this situation by increasing the amount of the interference, but it was discovered that this only resulted in galling of the metal which in turn was followed by freezing of the parts together.

It is a principal object of the present invention to provide a new and improved combination of mated, threaded male and female members, the thread on the male member being designed and constructed with relation to the thread of the female member so as to provide a predetermined amount of interference between the threads at predetermined circumferentially spaced apart areas whereby a high degree of back-off torque is retained after many loosening cycles.

It is a further object of the present invention to provide a new and improved combination of mated, threaded male and female members, the thread of the male member being provided with a plurality of circumferentially spaced apart lobes extending farther outwardly from the axis of such member than the remaining intermediate thread portions, and lobular thread portions on the male member being dimensioned relative to the thread of the female member so as to provide a predetermined interference therewith so that the two members may be threaded together with a driving torque that is as low as or lower than that required for other interference threaded combinations while a higher back-off torque is retained over a greater number of tightening and loosening cycles than in the case of such other combinations.

These and other objects and advantages of the invention will become more apparent as the description proceeds, while the features of novelty will be pointed out with greater particularity in the appended claims.

FIG. 1 is a side elevation illustrating a male member of the combination constructed in accordance with the present form of the invention.

FIG. 2 is an end view of the member illustrated in FIG. 1.

FIG. 3 is a schematic sectional view taken generally along the line 3—3 of FIG. 1.

FIG. 4 is a sectional view taken along the axial plane indicated at 4—4 in FIG. 3, FIG. 5 is an enlarged fragmentary view of a portion of the view shown in FIG. 3.

Figure 6:
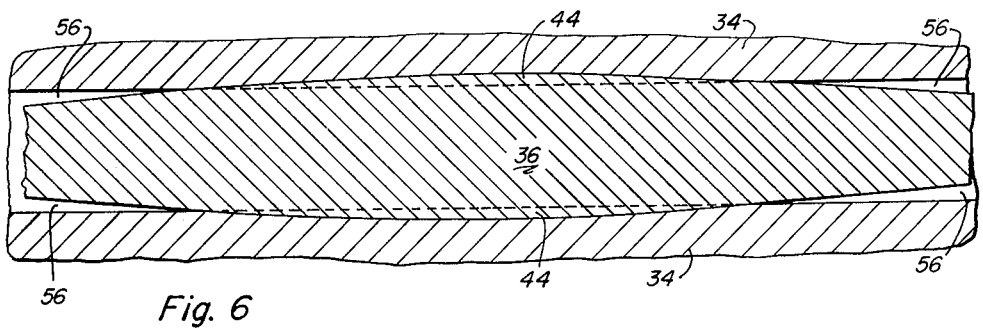
FIG. 6 is a fragmentary sectional view taken along the line 6—6 of FIGS. 4 and 5.

Referring now to the drawings, in FIGS. 1 and 2 is illustrated a threaded male member 10, in this instance a machine screw, of the thread-forming type manufactured and sold under the trademark "Taptite." The screw is provided with a suitable driving head 9 and a tapered work-entering end 11. Screws of this type are more fully disclosed and described in my co-pending patent application Serial No. 115,846, filed June 24, 1961, and entitled "Thread-Forming Devices and Method for Manufacturing Same," now Patent No. 3,195,156.

Screws of the aforementioned type are characterized by their arcuate polygonal cross-sectional shape and, in the illustrated modification, more specifically by an arcuate triangular cross-sectional shape. The screw thread 36 in this instance is defined by a plurality of circumferentially spaced apart lobes 12, 14 and 16 and intermediate arcuate sides 18, 20 and 22 the last-mentioned sides merging smoothly and gradually with the lobes therebetween. Referring more particularly to the enlarged schematic sectional view of FIG. 3, it will be noted that the lobes 12, 14 and 16 are spaced a greater distance outwardly from the axis of the screw than the intermediate sides 18, 20 and 22. In other words, the maximum radial dimension, indicated at 24, of the crest of each of the lobes is somewhat greater than the minimum radial dimension 25 of the crest of the thread portion intermediate the lobes. It follows, therefore, that the same relationship exists with respect to the pitch cylinder of the thread which is indicated by the dash line 26. It is understood, of course, that the pitch cylinder of the screw 10 is not of circular cross-sectional shape, but rather of arcuate triangular cross section. In FIG. 3, the screw 10 is illustrated as being threaded into a female member 28 provided with a tapped or threaded hole, the threaded hole, however, being of conventional circular cross section. This hole is indicated by the female minor diameter 31 and the female major diameter 30 of the thread.

Screws of the type illustrated in FIGS. 1 and 2, and as disclosed in my previously filed co-pending patent application, were originally designed to be driven into drilled but unthreaded holes, and during such driving operation to form their own threads by effecting a cold flowing of the metal of the side walls of the hole, somewhat akin to rolling of threads. The present invention distinguishes from the invention of the aforesaid application in that the present invention resides in the combination of a screw, such as illustrated in FIGS. 1 and 2, with a previously threaded or tapped female member, the threads of the two members being dissimilar in certain respects so that when mated together a predetermined interference will take place which will result in high frictional resistance between the two parts, which relationship persists even after a substantial number of tightening and loosening cycles.

Referring now to the enlarged sectional view, FIG. 4, attention is directed to the fact that the thread 34 of the female member 28 is of more or less standard form; that is, with a 60 degree included angle between the flanks of the thread. The threads 36 of the male member 10, however, are provided with a slightly smaller included angle, such as 48 degrees, as indicated. It is to be understood that the latter angle is not critical and may be varied. I prefer to use this angle because thread rolling dies for such threads are readily available commercially. Attention is directed to the fact that in this modification the pitch diameter 38 of the thread of the female member coincides substantially with the distance of the outermost limit, with respect to the axis of the pitch cylinder of the lobe 14 of the male member. In other words, referring more particularly to the diagrammatic sketch of FIG. 5, the pitch cylinder 38 of the thread 34 of the female member 28 is tangential to the pitch cylinder 26 of the lobe 14 along the axial plane of the maximum radial dimension of such lobe—that is, the sectional radial plane of FIG. 4.

The point of tangency is further indicated in FIG. 5 at 42. It will be observed, therefore, that the flanks of the two threads along the axial plane of FIG. 4 theoretically intersect each other at the line 38 and that they diverge slightly with respect to each other in the direction outwardly of the axis, the amount of resultant theoretical overlap of the threads along the flanks thereof being indicated by the cross-hatched zone 44. Stated in another way, the dimension of the thread of the male member in the axial direction radially outwardly of the line 38 is greater than the axial dimension between the adjacent flanks of the thread of the female member radially outwardly of the line 38. Also, it will be observed that the crest 46 of the thread of the male member 10 projects beyond the bottom of the groove 30 of the thread of the female member 34 so that in this area there is an amount of theoretical overlap as indicated by the cross-hatched zone 50. In other words, the maximum distance of the crest of the lobes 12, 14, and 16 of the male member from the axis thereof is greater than the distance of the root or groove 30 of the thread of the female from such axis whereby the crest of the lobes has predetermined interference with the aforementioned roots.

Figure 7:
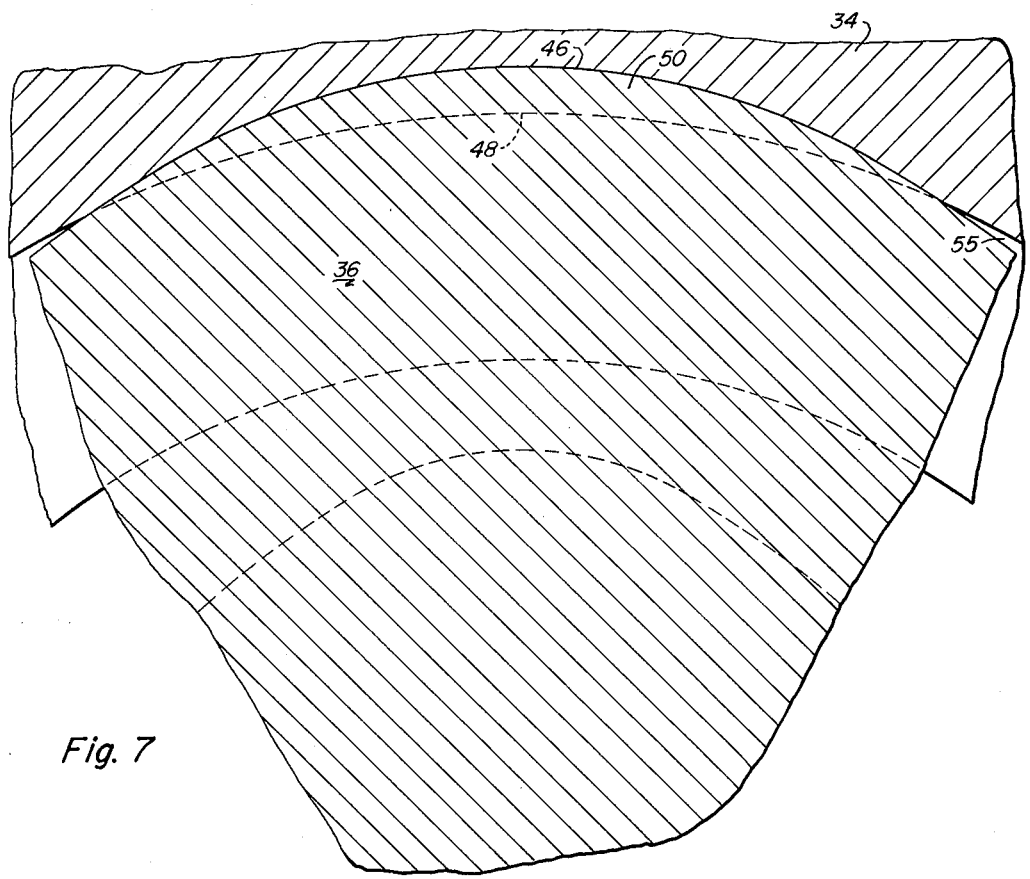
FIG. 7 is a fragmentary sectional view taken along the line 7—7 of FIG. 4.

Referring now to FIG. 6, in view of the fact that the pitch cylinder 26 of the lobe portion of the thread of the male member is of a shorter radius of curvature than the radius of the pitch cylinder 38, the zones of overlap 44, or interference zones at the flanks of the threads 34 and 36, diminish gradually and progressively to zero on each of the opposite sides of the plane of FIG. 4. Similarly, with reference to FIG. 7 and again due to the difference in radius of curvature of the pitch cylinders of the two threads, the interference zone 50 in the crest of each of the lobes likewise diminishes progressively to zero on each of the opposite sides of the plane of maximum interference as indicated along the plane of FIG. 4. Stated in another way, the interference between the adjacent flanks of the threads of the female member and of the lobes of the male member and along the radial centerline of the lobes to the outermost points thereof diminishes progressively in the radial direction inwardly on each of the opposite sides of the lobes from a maximum at the outer extremity thereof to zero at a point intermediate the height of the female thread. In FIG. 4, this intermediate or zero point lies on the line 38. From this point inwardly toward the axis, the adjacent flanks of the male and female threads diverge away from each other and are spaced apart as indicated at 54 in FIG. 4.

Because of the fact that the zones of interference 44 and 50 between each of the lobes of the male member 10 and the thread of the female member gradually feather out to zero in the circumferential direction as well as in the radial direction, the metal of the two members is subjected to a high degree of compression in the interference zones. Normally, it is contemplated that the dimensions of the male member shall be so proportioned relative to those of the female member with which the male member is to be employed that the interference zones exceed only slightly the elastic limits of the metal of the two members. Any excess metal which is permanently displaced on account of the interference of the threads and due to pressures beyond the elastic limit may flow into the voids 54 between the flanks of the two threads inwardly of the pitch cylinder 38. Also, of course, a substantial void exists between the crest 31 of the threads 34 and the roots 58 of the threads.

It is believed that the high retained back-off torque of the present screw is due to a certain amount of residual interference which is retained after the permanent displacement of excess metal into the voids 54 has taken place. It will be observed that further voids 55 occur on each of the opposite sides of the interference zones 50 in the circumferential direction, while similar voids 56 occur on opposite sides of the interferring zones 44, as shown in FIGS. 5 and 6. It is thought that metal may bulge into these voids 55 and 56 as the lobes rotate relative to the female member, in an elastic state that is, with the metal not being permanently displaced.

An important feature of the invention resides in the fact that due to the lobular cross-sectional configuration of the male member, the relatively low driving torque of the screw is occasioned by the fact that frictional resistance occurs only between relatively small contacting surface areas between the lobes and the immediate adjacent portions of the female thread. Hence high unit area forces are available for compression of the metal within these areas. It will be obvious that the driving torque is very much less than would be the case of mating threads which interfere with each other throughout their entire circumferential extent.

Attention should also be directed to the fact that the thread on the work entering end is tapered inwardly toward the axis of the screw as indicated at 11 in FIG. 1. Moreover, the lobular cross-sectional shape, as described with reference to FIG. 3 is also continued onto the tapered end portion, as illustrated more clearly in the end view of FIG. 2. This tapered end, with the shape shown, minimizes the tendency of galling or cutting of metal away from either part during the initial driving operation and the threads of the female member are smoothly re-formed with minimum effort.

It is also considered that the lobular shape of the threads on the work-entering end contributes substantially to the low initial driving torque characteristic of the screw for a still further reason. Since the force required for re-forming the threads in the female member is concentrated on the forward, outwardly sloping surfaces of the lobe portions of the thread on the tapered end, the thread re-forming is accomplished with a minimum of adjacent surface areas in frictional engagement with each other.

As evidence of the fact that a high degree of residual interference is retained in the interference zones, notwithstanding any metal displacement which may occur in the initial driving operation, laboratory tests have shown that a high degree of backoff torque is retained even after a multiplicity of cycles. In a typical example, a quantity of 1 7/32" x 5/16–18 heat treated and zinc plated screws substantially as hereinbefore described were driven into pre-tapped 5/16–18 holes in a low carbon steel plate, some of the holes being gauged and selected for maximum class 2B fit and others being gauged and selected for minimum class 2B fit, both with approximately 75% thread depths. The screws were driven into both sets of holes in the plate with a 1/8" steel spacer between the screw head and the plate to simulate an actual assembly. The screws were seated and set up at approximately 200 pound-inches. They were then backed off three or four turns, reversed, reseated again at 200 inch-pounds and again backed off, this process being repeated until each screw had been seated and backed off for a total of thirty times. The driving torque of each screw was measured as was the breakaway torque and retained resistance to loosening after two full back-off turns, for each driving and back-off cycle. The ranges of the breakaway and retained back-off torques in inch-pounds, as measured, are set forth in the following tabulation:

| Class of Hole Fit | No. Cycle | Driving Torque, Inch-Pounds | Breakaway Torque, Inch-Pounds | Retained Back-off Torque, Inch-Pounds |
|---|---|---|---|---|
| 2B max | 1 | 35–45 | 170–215 | 20–38 |
|  | 5 | 10–20 | 160–200 | 15–20 |
|  | 30 | 10 | 228 | 10–15 |
| 2B min | 1 | 40–45 | 200–230 | 35–40 |
|  | 5 | 10–30 | 170–250 | 20–40 |
|  | 30 | 10 | 170 | 20 |

Particular attention is directed to the fact that the average retained back-off torque for the fifth, as well as the 30th, cycle is greateh than the driving torque of the corresponding cycle. It will readily be recognized by those skilled in the art that ranges of retained back-off torque are considerably greater than in the case of other known interference thread combinations.

It is also important to note that identical screws work with substantially equal results in either minimum or maximum class fit holes, which is important since high precision drilling and tapping of the holes is not required.

It is to be understood, of course, that the pitch cylinder 26 of the lobular portions of the male member may not always coincide tangentially with the pitch cylinder 38 of the female thread, as indicated at 42 in FIG. 5, inasmuch as this relationship may vary depending upon the class of fit desired and also depending upon the tolerance provided within the permissive range of each class. As previously described above, the relationships shown in FIGS. 4 and 5 are theoretical only.

It is also mentioned that the lobular shape of the threads on the tapered work-entering end has been found particularly effective in cleaning debris, such as chips, paint or even porcelain, which has become lodged in the threaded female member during a previous processing step.. Due to the inherently low driving torque of the present screws, the presence of such debris in the threads of the female member creates no problem to the successful driving of the screws. Also, the tapered end enables the screw to be started easily, even by hand, for a few turns thereby insuring straight alignment of the screw with the hole upon application of the power driver.

It is to be noted that in the particular embodiment of screw illustrated in FIG. 1, the threads on the tapered work-entering end are of the so-called unfinished type; that is, the crests of the threads are not completely formed on this portion. It is to be understood, however, that the specific type of threads is not critical and may be varied as desired. For example, the threads on the tapered work-entering end may be fully formed, but of progressively decreasing height toward the extremity with a substantially constant root diameter. Alternatively, the threads on the tapered work-entering end may be of substantially uniform height and hence of substantially the same cross-sectional shape, but with progresively decreasing root and crest diameters. In each instance, however, the cross-sectional configuration of the threads is substantially the same as the cross-sectional configuration of the threads on the shank portion of the screw.

Particularly in the case of unfinished threads on the tapered work-entering end portion, it will be observed that the thread portions intermediate the lobes are slightly flattened as indicated at 15 in FIG. 2, but inasmuch as these portions of the thread do not engage with the female threads, such slightly flattened areas are of no consequence. Only the lobular portions of the thread on the tapered work-entering end portion, indicated by the areas 12, 14 and 16, are of important significance, since it is these portions which perform the major thread re-forming function with respect to the threads of the female member during the driving operation. It is to be understood, of course, that the extent of thread engagement of the lobular portions 12, 14 and 16 of the work-entering end increases progressively from the tip extremity in the direction toward the shank.

While the present invention has been described, with particular reference to one preferred embodiment, it is desired that it be understood that the present invention is not to be necessarily limited to the illustrated embodiment, and it is intended in the following claims to cover all such obvious variations and modifications as will occur to one skilled in the art.

I claim:

1. In combination, a male member and a female member, both having preformed interfering mating threads, the crest and root of the thread on said male member being of arcuate triangular cross section including arcuately curved sides and intermediate circumferentially spaced-apart lobes, the crest of said lobes extending a greater distance outwardly from the axis of said male member than the crest of the thread portions intermediate said lobes, said lobes merging smoothly and gradually with the thread portions of said male member on the opposite sides thereof, the included angle of the thread of said male member being uniform throughout and being slightly less than that of the thread of said female member with the axial dimension of the thread of the male member radially outwardly of a point intermediate the height of said lobes being greater than the axial dimension between adjacent flanks of the thread of the female member outwardly of said intermediate point whereby the opposite flanks of said lobes have predetermined material interference with the adjacent flanks of the thread of said female member, said interference diminishing progressively to zero in the circumferential direction on each of the opposite sides of the midpoints of said lobes, said interference increasing progressively in the radial direction on each of the opposite sides of said lobes from zero at said point intermediate the height of said lobes to a maximum at the outer extremity thereof, the maximum distance of the crest of said lobes from the axis of said male member being greater than the distance of the root of the thread of said female member from said axis whereby the crest of said lobes has predetermined interference with said roots, the adjacent flanks of said threads of said male and female members diverging with respect to each other into a spaced-apart relationship from said zero point in the direction inwardly toward the axis of said thread.

2. In combination, a male member and a female member, both having preformed interfering mating threads, the crest and root of the thread on said male member being of arcuate triangular cross section including arcuately curved sides and intermediate circumferentially spaced-apart arcuate lobes, the crest of said lobes extending a greater distance outwardly from the axis of said male member than the crest of the thread portions intermediate said lobes, said lobes merging smoothly and gradually with the thread portions of said male member on the opposite sides thereof, the included angle of the thread of said male member being uniform throughout and being slightly less than that of the thread of said female member with the axial dimension of the thread of the male member radially outwardly of a point intermediate the height of the thread being greater than the axial dimension between adjacent flanks of the thread of the female member outwardly of said intermediate point whereby the opposite flanks of said lobes have material interference with the adjacent flanks of the thread of said female member, the maximum distance of the crest of said lobes from the axis of said male member being greater than the distance of the root of the thread of said female member from said axis whereby the crest of said lobes has predetermined interference with said roots, said interference diminishing progressively to zero in the circumferential direction on each of the opposite sides of the midpoints of said lobes and on both the crest and flank portions thereof, said interference increasing progressively in the radial direction on each of the opposite sides of said lobes from zero at said point intermediate the height of said lobes to a maximum at the outer extremity thereof, the adjacent flanks of said threads of said male and female member diverging with respect to each other into a spaced-apart relationship from said last mentioned point in the direction inwardly toward the axis of said thread, said interference between adjacent thread portions exceeding only slightly the elastic limits of the metal of said male and female members.

3. In combination, a male member and a female member, both having preformed interfering mating threads, the crest and root of the thread on said male member being of arcuate triangular cross section including arcuately curved sides and intermediate circumferentially spaced-apart lobes, the crest of said lobes extending a greater distance outwardly from the axis of said male member than the crest of the thread portions intermediate said lobes, said lobes merging smoothly and gradually with the thread portions of said male member on the opposite sides thereof, the included angle of the thread of said male member being uniform throughout and being slightly less than that of the thread of said female member with the axial dimension of the thread of the male member radially outwardly of a point intermediate the height of the thread being greater than the axial dimesion between adjacent flanks of the thread of the female member outwardly of said intermediate point whereby the opposite flanks of said lobes have material interference with the adjacent flanks of the thread of said female member, the maximum distance of the crest of said lobes from the axis of said male member being greater than the distance of the root of the thread of said female member from said axis whereby the crest of said lobes has material interference with said roots, said interference diminishing progressively to zero in the circumferential direction on each of the opposite sides of the midpoints of said lobes and on both the crest and flank portions thereof, said threads of said male and female members being entirely spaced apart from each other between said lobes, said interference also diminishing progressively in the radial direction inwardly on each of the opposite sides of said lobes from a maximum at the outer extremity of said lobes to zero at a point intermediate the height of the female thread and from which point inwardly toward the axis the adjacent flanks of said male and female threads diverge away from each other, said interference between adjacent thread flanks exceeding only slightly the elastic limits of the metal of said male and female members.

References Cited by the Examiner

UNITED STATES PATENTS

| | | | |
|---|---|---|---|
| 2,352,982 | 7/1944 | Tomalis | 151—22 |
| 2,437,638 | 3/1948 | Evans | 151—22 |
| 2,637,361 | 5/1953 | Magel | 151—14 |
| 2,788,046 | 4/1957 | Rosan | 151—22 |

FOREIGN PATENTS 1,265,999   5/1961   France.

CARL W. TOMLIN, *Primary Examiner.*

EDWARD C. ALLEN, *Examiner.*